US000001527H

United States Statutory Invention Registration [19]

[11] Reg. Number: H1527

Moore

[45] Published: Apr. 2, 1996

[54] REDUCED FAT EXTRUDABLE CONFECTIONS AND METHOD FOR MANUFACTURE

[75] Inventor: Carl O. Moore, Rochester, Ill.

[73] Assignee: A. E. Staley Manufacturing Company, Decatur, Ill.

[21] Appl. No.: 254,962

[22] Filed: Jun. 7, 1994

[51] Int. Cl.[6] ..... A23G 3/00

[52] U.S. Cl. ..... 426/660; 426/659; 426/572

[58] Field of Search ..... 426/660, 659, 426/572

[56] References Cited

U.S. PATENT DOCUMENTS

| | | | |
|---|---|---|---|
| 4,761,292 | 8/1988 | Augustine et al. | 426/321 |
| 4,925,695 | 5/1990 | Martin, Jr. et al. | 426/660 |
| 5,190,786 | 3/1993 | Anderson et al. | 426/660 |
| 5,258,199 | 11/1993 | Moore et al. | 426/660 |

OTHER PUBLICATIONS

Lees et al Sugar Confectionery & Chocolate Manufacture, (1973) pp. 16, 132, 353–356.

Author: Carl O. Moore, Title: Formula, distributed on Jun. 24, 1993.

Author: Carl O. Moore, Title: Reduced Fat Chocolate, distributed on Jun. 24, 1993.

*Primary Examiner*—Charles T. Jordan
*Assistant Examiner*—Anthony R. Chi
*Attorney, Agent, or Firm*—Arnold, White & Durkee

[57] ABSTRACT

Reduced fat (fat contents range from about 5% to about 20%) confectionery morsels and bars and a method for their preparation are provided. The confection is manufactured by mixing a syrup component comprising a major amount by weight of a crystallizable saccharide and minor amounts by weight of water and emulsifier; with a flavoring component comprising a major amount by weight of flavoring and a minor amount by weight of fat; and a seeding component comprising a major amount by weight of starch and fat and minor amounts by weight of finely milled saccharide and emulsifier. The confection has the proper consistency for shaping with extrusion methods due to crystal formation, starch hydration, and moisture content.

20 Claims, No Drawings

REDUCED FAT EXTRUDABLE CONFECTIONS AND METHOD FOR MANUFACTURE

FIELD OF THE INVENTION

This invention relates to a method of making reduced fat extrudable confections having various flavors, including fruit flavors, and to chocolate-flavored confections useful in the preparation of reduced fat solid chocolate bars and baked goods.

BACKGROUND OF THE INVENTION

Health concerns have lead consumers to value reduced fat products, as well as, products with unsaturated fats substituted for saturated fats. Market demand continues to influence researchers to develop and continue to improve reduced fat food products. In that regard, traditional chocolate contains about 30% fat, and traditional chocolate chips contain about 22–25% fat. The high fat contents of traditional confections have led confectioners to experiment with reduced fat chocolate and other confections. "Reduced fat" confections, for the purposes of this application, are defined as confections having from about 5% to about 20% fat. Unfortunately, it has proven difficult to produce chocolate confections that have reduced fat, but which also have the texture and flavor of traditional fine chocolates. In addition to yielding a superior product, this invention provides reduced fat confections with a preliminary dough-like texture that allows confectioners to use extrusion methods to form them.

Depending on its ultimate use or form, chocolate may be molded, band deposited or deposited in a thickened state onto a chilled continuous hard surface. See B. L. Zoumas and E. J. Finnegan, "Chocolate and Cocoa", *Encyclopedia of Chemical Technology,* vol. 6, pp 1–19 (Kirk-Othmer, eds., John Wiley & Sons, Inc., New, N.Y., 3d ed. 1979). One such form or use, for example is as morsels or bits in baked goods. Regardless of form, however, the techniques for processing the chocolate are time consuming and costly, and the products are often variable in quality. There accordingly exists a need for a better and less expensive method for processing chocolate to make confections, especially reduced fat confections.

Food processors strive to improve the shelf life of foods. Melt resistance and bloom resistance are shelf life factors that must be considered when developing any new chocolate confection. Products that are stable at ambient temperatures are melt resistant i.e., they do not require refrigeration to hold their solid state. Bloom resistance means that a confection resists the formation of fat crystals that occur when cocoa butter changes state and sugar crystallizes. Both melting and bloom are negative factors, thus resistance to these factors are qualities that improve the shelf life of a confection. The baking performance of prior reduced fat chocolate morsels has not adequately mimicked that of traditional chocolate chips. The qualities of traditional chocolate chips that are particularly desirable are that the morsels semi-melt, and they do not lose their identity during baking, and they recover texture and quality nicely in the final product after baking and cooling.

Researchers continue to seek improvements in reduced fat confection products. For example, a reduced fat product that closely mimics traditional chocolate for use in a candy bar or in baked goods has not been developed before. Especially needed is a chocolate confection that demonstrates high quality baking performance and also shows adequate shelf life performance by demonstrating bloom and melt resistance. It is further desirable that methods of manufacturing reduced fat confections, including chocolate confections are reasonable, and preferably offer a reduction in manufacturing cost.

SUMMARY OF THE INVENTION

The present invention concerns confections that are reduced in fat content (that is, the fat content is generally about half that found in standard confections) and extrudable, but which never the less closely mimic the taste and feel of fine traditional confections and a method for making these confections. The method is especially suited to making reduced fat chocolate confections that are remarkably similar to high quality, high fat chocolate confections, and which are also marked by excellent shelf-life factors such as bloom and melt resistance. Chocolate confections made by this method have been found to closely resemble traditional chocolate morsels or chips in their ability to retain their identity during baking and to recover texture and quality after baking and cooling.

The method of the invention broadly comprises a sequence in which an aqueous, supersaturated saccharide syrup is mixed with a seeding composition comprising very fine saccharide crystals, instant starch, and fat; under conditions that crystallize the saccharide in the syrup and hydrate the starch. The seeding component should make up about 10% to about 25% of the final mixture. The resulting product has a dough-like consistency that is especially suited for extrusion. Extrusion methods are a preferred procedure for handling dough-like material, because they offer the benefits of manufacturing simplicity, reduced capital investment, faster production time, and lower production cost. In general the reduced fat extrudable confections of this invention have a fat content of about 5% to about 20% by weight, preferably about 10% to about 12% by weight.

In preparing the supersaturated syrup, the saccharide and the aqueous medium are heated to a temperature sufficient to solubilize the saccharide, preferably about 240° F. to about 250° F. Before adding the seeding component, however, the syrup is cooled to a temperature that is suitable for crystallizing the saccharide in the syrup as well as hydrating the starch. At the same time, however, the temperature must not be so high as to melt the saccharide crystals. A suitable temperature for this phase of the process has been about 200° F. give or take 20 degrees.

The saccharide in the seeding component is preferably less than about 20 microns in size, such that the final dough-like product possesses a fine crystal size and hence a smooth mouth feel. Milled saccharide, especially saccharides milled in oil, have been found to be very effective. The oil employed in the milling operation is preferably selected to serve as a fat component of the final product. Thus, following a milling operation, the fine saccharide crystals are not separated from the milling oil, but instead are added to the syrup together with the oil. Additionally, products generally known in the art as chocolate product, white compound, and standard chocolate contain finely milled seed crystals that make these products suitable for use in the seeding component.

The amount of fat added to the syrup should preferably be such as to provide the final product with about 5% to about 20% fat. The fat may be an animal fat, but is preferably a vegetable fat. To facilitate dispersion of the fat and the other components, an emulsifier is preferably added to the syrup along with the fat.

The starch added to the hot supersaturated syrup should be an instant starch with a cold-water solubility greater than about 50% by weight. It may be precooked starch, but is preferably a cold-water swelling starch and especially non-birefringent, non-granular drum dried or spray cooked instant starch. The amount of starch should be such as to form about 1 to about 10% of the final product.

A wide variety of flavors may be added to the products of the invention. In that regard, the method of the invention is especially concerned with the manufacture of chocolate confections that closely mimic traditional fine chocolate confections, but which are preferably reduced in fat content, i.e., between about 5% and about 20% by weight.

In a preferred embodiment of the invention, "chocolate compound" is employed as a seeding material to crystallize the saccharide in a supersaturated syrup. "Chocolate compound," as is well known in the art, is a chocolate flavored confection that has had cocoa butter removed and a different type of fat substituted in the cocoa butter's place.

The invention in another broad aspect comprises a reduced fat confection, especially a chocolate confection, comprising a dough-like, extrudable mixture. The fat content of these confections may be 5% to about 20% fat, which may be much less than that found in traditional chocolate. The confections are made from a syrup that includes major amounts by weight of crystallizable saccharide and instant starch and minor amounts of emulsifiers, flavoring ingredients and a seeding component of finely milled sugar crystals. As explained earlier, the crystallizable saccharide forms crystals when the seeding compound is added. The fineness of the seeding crystals is responsible for the fine texture that develops. The starch forms a gel structure that also adds to the texture of the confections.

More specifically, the invention comprises a mixture that has the proper consistency for use of extrusion methods to form the confection. The invention typically comprises the mixture of a syrup component, a flavoring component, and a seeding component. In the case of a chocolate confection, the syrup component comprises more than about 50% by weight crystallizable saccharide, about 8–9% by weight of water, less than 1% by weight emulsifier, and the balance of the syrup contains non-crystallizable saccharides, and other humectants such as glycerin, sugar alcohols or polydextrose. The flavoring component comprises about 50% to about 70% by weight of cocoa, about 30% to about 50% by weight of fat and about 1% to about 2% emulsifier. The seeding component comprises about 40% to about 50% chocolate product, about 20% to about 25% fat (exclusive of the fat contained in the chocolate product), about 30% to about 40% starch and about 1% emulsifier.

A preferred embodiment of this invention relates to a method of preparing a chocolate-flavored confection comprising:

preparing a syrup mixture consisting of a major amount by weight of an aqueous syrup comprised of a crystallizable saccharide, heating said aqueous syrup to make it supersaturated with respect to said crystallizable saccharide, cooling said aqueous syrup to less than about 200° F.;

preparing a low moisture seeding component comprised of finely milled saccharide, a fat component and an instant starch having a cold-water solubility of greater than 50 weight percent, the amount of water in said seeding component being insufficient to dissolve a major portion of said instant starch;

preparing a flavoring component comprised of flavoring ingredients;

adding said flavoring component to said syrup mixture and mixing to form a flavored syrup mixture;

adding said seeding mixture to said flavored syrup mixture and mixing to disperse said seeding mixture to form confectionery mixture; and dividing said confectionery mixture into separate portions in an environment that allows crystallizable saccharide to crystallize from said mixture onto said crystallizable saccharide in crystalline form.

This invention also relates to flavored confectionery pieces consisting essentially of at least 40% by weight of a crystallizable saccharide, at least a portion of said crystallizable saccharide being in crystalline form; a minor amount by weight of a fat ingredient; a minor amount by weight of flavoring ingredients; a minor amount by weight of an instant starch having a cold-water solubility of greater than 50 weight percent; and a minor amount of water, the amount of water being sufficient to hydrate the instant starch into the desired functional state. The confectionery pieces contain about 5 to 20% fat and/or oils and can be extruded or shaped to form solid confectionery pieces or bars. Such pieces are especially useful for inclusion in reduced fat foods.

This invention also relates to baked goods comprising a continuous carbohydrate matrix and flavored confectionery pieces as described above in association with and in fixed relation to said continuous carbohydrate matrix and to a method of making such a baked good comprising baking a dough or batter comprising a major amount of a carbohydrate component and a minor amount of flavored confectionery pieces as described above.

This invention also relates to a candy piece comprising a confectionery shell surrounding a core comprised of a chocolate flavored confectionery piece as described above. Such confections are prepared by sugar panning a plurality of such chocolate confectionery pieces to coat such pieces with a confectionery shell. The core of the piece mimics the mouth feel of true chocolate, but is reduced in fat content (e.g. contains less than about 20% fat by weight) as compared to traditional chocolate confections.

As used herein, the term "a major amount" shall mean at least about 50% by weight and the term "a minor amount" shall mean less than about 50% by weight.

DETAILED DESCRIPTION OF THE PREFERRED EMBODIMENTS

The fat content of confections of the invention is preferably from about 5% to about 20% by weight, which may be less than one-half of the fat content of traditional chocolate. A confection of this invention comprises a major amount by weight of sugars and/or sugar alcohols. The precise amount of the sugars (total of the syrup and the seed) may vary. The confection is made by mixing a syrup component with a flavoring component and then adding a seeding component. The extrusion consistency of the confection is formed by the crystallization of saccharide upon adding the seeding component and hydration of the instant starch. It is this novel extrusion property that reduces the production cost for this invention over other confection products that must be molded. The finely milled saccharide crystals of the seeding component aid in giving this invention the textural qualities that mimic those of traditional chocolate morsels and make it superior in quality to reduced fat confections of the past. Chocolate product, white compound, standard chocolate, or saccharide crystals that have been finely milled in oil may be used as seeding components to produce confections that are extrudable and possess a texture that mimics that of fine chocolate.

A. The Syrup

The first step in preparing a confection of this invention is obtaining a high solids syrup mixture that is solubilized and heat evaporated into the range of about 10% to about 15% moisture content and then cooled to about 200° F. The syrup is comprised of a crystallizable saccharide. "Crystallizable saccharide" means a sugar or sugar alcohol that is susceptible to crystallization from a concentrated aqueous syrup. Dextrose and sucrose are examples of suitable sugars. Examples of sugar alcohols that are suitable include sorbitol, mannitol, and xylitol. The use of sucrose as the crystallizable saccharide is preferred.

Sucrose is available commercially in a dry crystalline form and is generally derived from sugar cane or sugar beets.

Dextrose is available commercially in the anhydrous or monohydrate crystalline form, or as a syrup, including syrups containing a mixture of dextrose and another material, e.g. high fructose corn syrup and 64 D.E. corn syrup. Dextrose is generally obtained by the hydrolysis of starch, e.g. from corn. The production and properties of dextrose and corn syrups are discussed by H. M. Pancoast et al., Handbook of Sugars, pp. 157–287 (AVI Publ. Co., Westport, Conn., 2d ed., 1980), the disclosure of which is incorporated by reference. Substantially pure dextrose, as crystalline monohydrate or high solids syrup (e.g. about 70% by weight) is preferred for use here. Corn syrups are characterized by dextrose equivalent (D.E.) with high conversion syrups having a high D.E. and a high concentration of dextrose. Lower conversion syrups may be useful, but are not preferred. Corn syrups are typically an inexpensive source of dextrose and thus may be a preferred source of dextrose for this reason.

The aqueous syrup may also contain saccharides that are relatively resistant to crystallization, e.g. fructose. Fructose may be derived from crystalline fructose, a high fructose corn syrup, or an invert syrup. Crystalline fructose is also an item of commerce, but has historically been much less plentiful than dextrose and corn syrups. The crystallization of fructose is disclosed in U.S. Pat. Nos. 3,883,365 (Forsberg et al.), 3,928,062 (Yamauchi), 4,199,374 (Dwivedi et al.), and 4,643,773 (Day). Crystalline fructose is distinguished from materials containing significant amounts of amorphous fructose or corn syrup by-products, e.g. the semi-crystalline fructose disclosed in U.S. Pat. No. 4,517,021 (Schollmeier). Crystalline fructose is available commercially at a purity in excess of 99.0% as the anhydrous crystalline form of beta-D-fructose, for example KRYSTAR® brand crystalline fructose available from A. E. Staley Manufacturing Company, Decatur, Ill.

The dextrose (and fructose) may also be obtained by the use of high fructose corn syrup or an invert syrup. "High fructose corn syrup" (HFCS) means a corn syrup containing at least about 40% fructose by weight of dry solids (d.s.), typically from about 40% to about 60% (e.g. the two most common HFCS are at a nominal 42% or 55% d.s. fructose). High fructose corn syrups are items of commerce as disclosed by H. M. Pancoast et al., *Handbook of Sugars,* pp. 176–177 and 232–233. The Type A high fructose corn syrup referred to in the *Handbook of Sugars,* which has 42% d.s. fructose is the product of enzymatic isomerization of a glucose syrup that generally has from 5–8% higher saccharide (e.g. disaccharide, trisaccharide, and so on). The Type B high fructose syrup contains 55% d.s. fructose and is typically obtained by chromatographic fractionation of a Type A syrup, but can be obtained by other means of fructose enrichment of a Type A syrup (e.g. crystallization of dextrose from a Type A syrup). Invert syrup is obtained by the "inversion", i.e. hydrolysis of sucrose.

An emulsifier may be added to aid in forming the syrup. A preferred emulsifier is a mixture of mono and diglycerides. There are numerous brands in the market place. An example of a suitable emulsifier is Dimoden PVK, which is available from Grinsted in Kansas City, Kans. The emulsifier affects the product's texture by aiding to bind the fat in the seeding and flavoring components to the water based syrup. The monoglycerides in the emulsifier also complex with the starch, which has an additional affect on texture.

Vanilla flavoring may be added to the syrup as a flavoring. A suitable vanilla flavoring is one made by Virginia Dare and is a mixture of natural and artificial flavors. Cocoa may be cooked in the syrup for enhanced chocolate flavor.

Sucrose, dextrose, fructose or combinations thereof are used to prepare a syrup that is supersaturated. Dry or liquid sweeteners may be combined in any order. Crystalline fructose and crystalline dextrose may be mixed with a syrup separately or premixed together before mixing with the syrup. The precise ratio of dextrose to fructose may vary widely depending upon the precise characteristics desired in the resulting product, but there will generally be a major amount by weight (e.g. more than 50% d.s.b.) of sucrose and, if any, a minor amount by weight (e.g. less than 50% by weight d.s.b.) of dextrose and/or fructose. The relative amounts of saccharide in the syrup mixture will generally range from about 50% to about 100% of the syrup.

The water used to prepare the syrup can be from any potable source or can be supplied by one of the sweetener syrups described above. The precise amount of water in the syrup may vary and will depend, at least in part, upon the amounts of the sugars and sugar alcohols present because such materials tend to inhibit the hydration and gelatinization of the granular starch component and upon the ratios of the sugars because sucrose tends to have a greater inhibitory effect than dextrose, which in turn has a greater inhibitory effect than fructose. When dry saccharide ingredients are used to prepare the syrup mixture, it will be necessary to add water to make a syrup containing about 10 to 35%, preferably 15 to 25% water. In such instance, it will be necessary to evaporate the excess moisture from the saccharide and water mixture to yield a super saturated saccharide syrup mixture containing about 10% to 15% moisture. The syrup should be heated to a temperature of about 240° F. to about 250° F. to reduce the moisture to the desired level and then cooled to a temperature that will allow the starch to be hydrated but will not melt the sugar crystals of the seeding component when it is added. This temperature depends on the solids content of the syrup and the susceptibility of the chosen instant starch, but may be about 200° F.

B. The Seeding Component

Another step in the preparation of the confection involves the preparation of a low moisture seeding component. The seeding component is comprised of a saccharide or sugar alcohol, such as sucrose, fructose, dextrose, and/or sorbitol that is finely milled in liquid oil. The major saccharide component of the seeding component should be the same saccharide that comprises the major portion of the syrup mixture. The seeding component also includes fat and an instant starch having a cold-water solubility of greater than 50 weight percent. The amount of water in the seeding component should be insufficient to hydrate the instant starch or dissolve the seed crystals.

The seeding component containing the saccharide component provides the crystals to initiate the crystallization of saccharide in the syrup mixture and thus form microcrystals of saccharide dispersed in a liquid phase. The precise particle size of the saccharide seed may vary depending upon the texture desired in the resulting confection, but generally includes seed crystals finer than about 20 microns in size. The saccharide seed typically comprises from about 1% to about 5%, preferably 2 to 3% by weight of the confection product of this invention. Seeding is typically accomplished by mixing the seed with the syrup so as to obtain a substantially homogeneous dispersion of the seed throughout the syrup.

Standard chocolate may be used for seeding purposes, but the preferred material is chocolate compound. Standard chocolate must include only cocoa butter as fat, whereas chocolate compound is chocolate with fat included that is not cocoa butter. Chocolate compound is commercially available from Ghiradelli, of San Francisco, Calif., or as Non Tempering Confectioner Coating, CF-1003 from Ambrosia Chocolate in Milwaukee, Wisc. During the preparation of chocolate and chocolate compound, sugar is very finely ground in oil on a roller refiner. The process grinds the sugar down to about a 10 micron size. The finer the seed crystal, the finer and smoother the texture of the confection. This fine seed crystal is what makes chocolate compound such an excellent addition to the seeding component.

For use in confections that are not chocolate flavored, seeding crystals may be prepared by finely milling sugar crystals in oil. Seed crystals may be milled in edible oil that is suitable to add to the confection along with the crystals. If a commercial preparation of seed crystals is desired, white compound is suggested. Either separate finely milled seed crystals or white compound is especially desirable if flavoring materials other than chocolate are used to flavor the confection.

A critical ingredient of the seeding component is an instant starch having a cold-water solubility greater than about 50% by weight. An instant starch is a starch that is capable of hydrating in room temperature water. There are two types of instant starches: pre-cooked starches (e.g. by drum drying a cooked slurry or spray cooking a slurry of native starch) and cold-water swelling granular starches. An example of a pre-cooked starch is a pre-gelatinized waxy corn starch available from the A. E. Staley Manufacturing Company as GELATINIZED DURAGEL™. Cold-water swelling starches are, however, particularly preferred, especially those that are non-birefringent, e.g. MIRA-GEL® brand cold-water swelling starch from the A. E. Staley Manufacturing Company. The preparation of such starches is described in U.S. Pat. No. 4,465,702 (Eastman et al.), the entire disclosure of which is incorporated by reference. This starch is distinguished from pre-gelatinized starch in that most of the granules are still intact despite the ability of the starch to swell and then gel in cold water, e.g. water at room temperature. The starch is also characterized as unmodified, i.e. having little or no chemical modification that impairs the ability of the starch to form a gel. The ability of the granular starch to swell and then form a gel in cold water can be visually observed, e.g. with a microscope, and can be quantified by measuring the viscosity of an aqueous dispersion of the starch. The ability of the starch to swell in cold water can generally be correlated to the cold-water solubility of the starch. Thus, cold-water solubility can generally be used as a measure of cold-water "swellability". Cold-water solubility is conveniently determined by mixing a known weight of starch in a measured volume of distilled water at room temperature with a Waring blender, centrifuging the starch suspension and weighing the residue obtained by evaporation of a measured aliquot of the supernatant liquid. The cold-water solubility of the sample is expressed as % solubles, dry solids basis (dsb). The precise means of determining cold-water solubility is described in Example 1 of U.S. Pat. No. 4,465,702.

The treatment of the starch to increase its ability to swell in cold water, known as conversion, is generally accomplished by contacting the granular starch with an aqueous alcohol, the contact occurring for a time and at a temperature sufficient to achieve the desired degree of conversion.

It is important that the instant starch is exposed to the final syrup mixture at temperature conditions that will cause the starch to hydrate but will not cause the seed crystals to melt. The precise temperature will depend upon the solids content of the syrup, the susceptibility to hydration of the chosen instant starch and the length of time the starch is held at a certain temperature. Balancing the factors, an optimum temperature is about 200° F. give or take 20 degrees.

The amount of instant starch in the seeding component should be controlled so that the final confectionery piece will contain from about 1% to about 10% instant starch. Generally the seeding component will contain about 25% to about 50% instant starch.

The third ingredient of the seeding component is the fat component. Vegetable or animal fats may be used; however, vegetable fats are preferred for dietary reasons. The total amount of fat in the seeding component should be controlled to provide a finished confectionery piece preferably containing from about 5% to about 20% by weight of fat, preferably from about 10% to about 12% by weight of fat. Generally, the seeding component will contain about 25% to about 50% by weight of fat. Suitable fats are well known by persons skilled in the art of candy making and include solid or plastic, as well as liquid or semi-fluid, glyceride shortenings derived from animal, vegetable fats and oils, including synthetically prepared shortenings so long as the fat has an appropriate melting point for confectionery products.

Glycerides of the fat component may contain saturated and unsaturated "long-chain" acyl radicals having from about 12 to about 22 carbon atoms such as cocoa butter, lauroyl, lauroyleoyl, myristoyl, myristoleoyl, palmitoyl, palmitoleoyl, stearoyl, oleoyl, linoleoyl, linolenoyl, arachidoyl, arachidonoyl, behenoyl, erucoyl, and the like and are generally obtained from edible oils and fats such as corn oil, cottonseed oil, soybean oil, coconut oil, rapeseed oil, peanut oil, olive oil, palm oil, palm kernel oil, sunflower seed oil, lard, tallow and the like. A preferred oil component is cocoa butter or any fat or oil material with properties similar to cocoa butter including chocolate liquor. These glycerides may also contain, in part, one or two short-chain acyl groups having from 2 to about 6 carbon atoms such as acetyl, propanol, valeryl, and caproyl; they may be prepared by random or low-temperature interesterification reactions of fatty triglyceride containing oils and fats such as interesterified or rearranged cottonseed oil and lard; and they may be otherwise formed by various organic syntheses.

Some typical fat components are soybean-based shortenings or oils, hydrogenated soybean-based shortening or oil, corn oil, palm oil, hydrogenated palm oil, lard and tallow oils. Of these, Kaomel brand shortening or oil, which is soybean-based, is preferred. Kaomel oil or shortening is commercially available from Vandenberg Foods.

Lecithin is added to the seeding component as an emulsifier. It controls viscosity in the mixing procedure by allowing the fat to coat the dry particles of sugar crystals and starch. Lecithin is commercially available from A.D.M.

The seeding component is prepared by melting and mixing the fat components at about 110° F. to about 160° F., preferably about 140° F. Then adding the instant starch, the chocolate compound, and the lecithin. The seeding component mixture is then held at a temperature between about 110° F. and about 160° F. preferably at about 140° F. until it is used to prepare the confectionery.

C. The Flavoring

Any flavor that is generally associated with candy such as chocolate, strawberry, raspberry, cherry or citrus flavors may be added to the syrup. Chocolate flavoring may be made by adding chocolate liquor or cocoa. Chocolate liquor is the solid or semi-plastic food prepared by finely grinding the kernel or nib of the cocoa bean. B. L. Zoumas and E. J. Finnegan, "Chocolate and Cocoa," *Encyclopedia of Chemical Technology,* vol. 6, p. 5 (Kirk-Othmer, eds, John Wiley & Sons, Inc., New York, N.Y., 3d ed., 1979). Cocoa powder is prepared by pulverizing the material remaining after part of the cocoa butter is removed from chocolate liquor. Id. at p. 8. Cocoa powder suitable for using in the practice of this invention may include both the conventional 10–12% pressed cocoas, or the more recently developed extracted low fat cocoas that are less than 1% in fat content. An example of the latter product is DeZann's defatted cocoa marketed under the tradename DEZANN DEFATTED S™. The advantage of using the defatted cocoa is that the problem of chocolate bloom and discoloration usually associated with cocoa butter can be virtually eliminated from the confection. The naturally occurring starch component within the defatted cocoa powder is reactive and functional with this confectionery process, which makes the defatted cocoa the preferred product in certain formulations. As an example, a preferred cocoa component is made of non-fat cocoa powder, Kaomel Vegetable Oil and Lecithin. The production of cocoa powder is described in Minifie, pages 28–68, the disclosure of which is incorporated by reference herein. The cocoa used in this invention may be processed from either natural or "Dutched" chocolate from which a substantial portion of the fat or cocoa butter has been expressed or removed by solvent extraction, by pressing, or by other means known to those skilled in the art.

The amount of cocoa used will generally be a minor amount, typically from about 1% to about 10% by weight of the confection ingredients. The precise amount used will depend upon the level of flavor desired and the particular cocoa chosen. For example, Dutched chocolate is prepared by treating cocoa nibs with an alkali material, such as potassium carbonate, in a manner well known in the art. Generally, it tends to have a darker color and also can be more flavorful than natural cocoas, and thus less will be needed to obtain a desired level of flavor.

Cocoa may be cooked with the syrup component to enhance its chocolate flavor, or it may be added as a separate flavoring component. A separate chocolate flavoring component may include cocoa and the same fat and emulsifier as was discussed above in the section on the seeding component. (See Supra p. 12–13). The suggested fat for a chocolate flavoring component is Kaomel, a soybean based shortening from Vandenberg Foods. Lecithin is the suggested emulsifier, and it is available from A.D.M.

D. Mixing the Confection

The confection is made by mixing the syrup component with a flavoring component and then adding a seeding component. As the syrup is prepared, it is heated to a temperature sufficient to solubilize the saccharide, which is about 240° F. to about 250° F. However, before adding the seeding component, the syrup is cooled to a temperature that is suitable for crystallizing the saccharide in the syrup, hydrating the starch, and at the same time not so high as to melt the seeding crystals. A suitable temperature for this phase of the process has been about 200° F. give or take 20 degrees. The seeding component is added in a quantity sufficient to cause crystallization of the saccharides in the syrup. The seeding component should make up about 10% to about 25% of the final mixture to promote the development of a dough-like consistency.

E. Shaping the Confection

After the seeding component is dispersed in the flavored syrup mixture, the confection reaches a dough-like consistency in about 3 to about 5 minutes and is ready to be extruded or shaped. Morsels may be prepared by die face cutting the warm dough to the desired size as it is extruded. The cut morsels are then placed in a revolving drum and tumbled to round each morsel. Then they are allowed to cool and are ready to use.

Candy bars may be formed by extruding a flat ribbon of confection and passing the ribbon under a die roller to print the bar design and cut the ribbon of confection into a candy bar the desired length.

Another method for shaping this invention may involve the use of conventional hard candy forming technology, in which a continuous rope of candy is formed and passed through various cutter designs to produce individual pieces. Chain cutters and circular gang knives that spin and cut balls or starlight mints are examples of such equipment.

Candy pieces may also be shaped by the die forming method, in which the confection is pressed between two rollers. On each roller there is one half of a mold called a die. As the rollers turn and the dies meet, the candy is molded. The rollers are refrigerated so the confection hardens immediately. First, the confections are formed with a thin web between them, then they are run over a shaker that breaks them up separating out the candy pieces.

Candy pieces may also be shaped in molds, but the time for curing is greatly reduced over that of traditional chocolate, because the candy firms up quickly.

F. Coated Confections

Morsels or bars may be coated with a confectionery shell to form a candy. The application of confectionery coatings is described in Minifie, pages 450–454, the disclosure of which is incorporated by reference. In general, morsels are introduced into a rotating pan along with a syrup comprised of a crystallizable sugar or sugar alcohol, as described above. The syrup coats the morsels, and, when dried, forms a shell surrounding the morsels as a confectionery coating. This process is called panning.

G. Baked Good Inclusions

An especially advantageous use of the morsels of this invention is in the production of baked goods containing such morsels, especially chocolate morsels. The starch in the morsel tends to substantially inhibit, and preferably essentially prevents, melt away and loss of morsel integrity during baking. This product semi-melts, but does not lose its identity and recovers texture and quality very nicely in the finished baked product. "Baked goods" means those goods that are fried, e.g. doughnuts, shell pastries, pancakes, and the like, in addition to traditional oven baked goods such as cakes, cookies, and brownies. Baked goods generally are comprised of a continuous carbohydrate matrix that is typically comprised of flours and/or starches, most commonly in admixture with one or more sugars. Bulking agents such as maltodextrins and/or polydextrose may be used to replace at least a portion of the flour, starches and/or sugars that are typically used. Various other functional ingredients, e.g. flavors, colors, fruits, nuts, shortening, emulsifiers, etc., are typically dispersed within or upon the matrix. The typical components of the baked products will be discussed in more detail below.

Flour provides a major component in the bakery products of the present invention. The flour may be any finely comminuted meal of any cereal grain or edible seed, or mixtures of the two, as are known by one skilled in the art of baking. Typical non-limiting examples include wheat flour, barley flour, rye flour, cornstarch and corn flour, triticale, and also the so-called synthetic flours, that incorporate such materials as starch and soy protein isolate, with or without heat and/or steam treatment. The wheat flours are most typically used in baking. They consist of several types, including hard red spring, hard red winter, soft red winter and white winter and spring. They are distinguished by differences in gluten quality, water absorption and protein content. Protein in these flours can vary from about 7% to about 14%, with the soft wheat flours having protein contents at the lower end of that range and hard winter wheat flours having protein contents at the upper end of that range.

The amount of protein in a baked good influences its texture and tenderness. The primary source for protein in baking is egg. However, since flour also contains some protein, the type of flour used in baking can influence the final product's texture somewhat. The higher the protein content in a flour, the tougher texture a product baked with that flour will have.

Another major component of many baked goods, particular cookies and cakes, is a sweetener. Carbohydrate sweeteners such as sucrose, fructose, dextrose, and the like are commonly used. The sweetener may be a mixture of two or more sweeteners and may be a syrup, e.g. invert syrup or high fructose corn syrup.

Emulsifiers are typically added to a dough or batter used to prepare baked goods. Preferably, from about 0.1% to about 10% of an emulsifier will be added to the dough or batter. Suitable emulsifiers include, but are not limited to, lactylated mono- and diglycerides, propylene glycol monoesters, polyglycerol esters, sorbitan esters, diacetylated tartaric acid esters of mono- and diglycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof. Polyglycerol esters suitable for use as emulsifiers typically have an average of from 2 to 10 glycerol units and from 1 to 3 fatty acyl groups of from 14 to 18 carbon atoms per glycerol moiety.

Shortening, in the form of oil or a high melting fat, is commonly included in baked goods. The percentage of shortening in many baked goods is from about 10% to about 25%. In preferred embodiments of this invention, the baked goods will have reduced levels of fat compared to conventional baked goods. The shortenings that can be employed are well known by one skilled in the art of baking and include solid or plastic, as well as liquid or semi-fluid, glyceride shortenings derived form animal, vegetable fats and oils, including synthetically prepared shortenings. These glycerides can contain saturated and unsaturated "long-chain" acyl radicals having from about 12 to about 22 carbon atoms such as lauroyl, lauroyleoyl, myristoyl, myristoleoyl, palmitoyl, palmitoleoyl, stearoyl, oleoyl, linoleoyl, linolenoyl, arachidoyl, arachidonoyl, behenoyl, erucoyl, and the like and are generally obtained from edible oils and fats such as corn oil, cottonseed oil, soybean oil, coconut oil, rapeseed oil, peanut oil, olive oil, palm oil, palm kernel oil, sunflower seed oil, wallflower oil, lard, tallow and the like. These glycerides can also contain, in part, one or two short-chain acyl groups having from 2 to about 6 carbon atoms such as acetyl, propanol, valeryl, and caproyl; they can be prepared by random or low-temperature interesterification reactions of fatty triglyceride containing oils and fats such as interesterified or rearranged cottonseed oil and lard; and they can be otherwise formed by various organic syntheses.

Some typical shortenings are soybean-based shortenings or oils, hydrogenated soybean-based shortening or oil, corn oil, palm oil, hydrogenated palm oil, lard and tallow oils. Of these, "Crisco" brand shortening or oil, which is soybean-based, is preferred. "Crisco" oil or shortening is commercially available from The Proctor & Gamble Company.

Eggs may be used in making the baked products of the present invention. Eggs impart flavor, richness and color to the baked goods. On the average, an egg contains about 73% water and about 27% egg solids. The egg solids comprise about 48% protein, about 44% fact, and about 8% minor materials. Alternatively, egg solids, particularly egg albumen and dried yolk, may be used in baking the products disclosed here. Soy isolates, whey protein concentrates, or other egg substitutes may also be used here either singularly or in combination with, or in place of the egg solids. Such substitutes are well known to those skilled in the art of baking. From 0% to about 6%, preferably from about 0.1% to about 6%, on a dry solids basis, of the formulation for the baked products should comprise egg or egg substitute.

Chemical leavening agents may also be added to the baked goods to provide aeration to the final product. Examples include baking soda, e.g. sodium, potassium, or ammonium bicarbonate, alone or in combination with a baking acid, preferably sodium aluminum phosphate, monocalcium phosphate, dicalcium phosphate or mixtures thereof. The selection of the leavening system is within the knowledge of one skilled in the art. From 0% to about 2%, preferably from about 0.1% to about 2%, of the formulation for the products of the present invention will typically be leavening agent.

Additional components may be added to the batter or dough of the present invention prior to baking to provide a wide variety of snack products. Additives may be of a type that remain as whole pieces in the snack product. Such additives include, but are not limited to, fruit or fruit-flavored bits, such as blueberry, strawberry, or citrus flavored bits, other fruit-flavored bits, such as cherry, blackberry, apricot, raisin, date or apple; cereals, such as bran or oatmeal; and nutmeats, including walnuts, black walnuts, hickory nuts, hazel nuts, Brazil nuts, peanuts, macadamia nuts, pecans, almonds, cashews, coconut and the like. From 0% up to about 40% of the final baked product of the present invention can be such additive.

Other components of a type that are blended into the dough or batter prior to baking may be incorporated to add flavor, aroma, and color to the final baked product. For example, peanut butter; spices, such as cinnamon, mace, nutmeg, caraway, anise, allspice, poppy seed, coriander, ginger, cloves, fennel and salt; and flavorings, such as banana, orange, lemon, mint or vanilla. Honey or molasses may also be used in the present invention but the levels of the individual sugars in the saccharide mixture must be altered to account for the sugars in the molasses or honey. Mixtures of these flavorings and whole piece components can be added to provide a variety of desirable products. Up to about 25% of the final baked product of the present invention may be comprised of such additives. The exact amount added for any of these flavoring components (whether they are of the type that is blended into the composition or the type that remain as whole pieces) will depend on personal preference and on what particularly is being added.

The basic components and the optional components that make up the baked goods of the present invention may be combined in a number of slightly different ways to yield different types of baked goods. Obviously, the amount and type of flavorings, spices, or whole piece components, such as fruit pieces, nuts, etc., may be manipulated to vary the products. Different icings or streusel toppings may also be added for variation. Additionally, the texture of these products may be altered to yield different types of product. This is done through the manipulation of the total protein content in the composition of the baked good. It is the protein content that gives a baked product its structure. Two important sources of protein are found in baked goods, protein in the flour, and protein in the egg (or egg substitute). A brownie or cookie, which tends to be a more dense product, contains a limited amount of protein. A snack cake or muffin is characterized by a lighter, airier structure. Additional protein must be added to create a product with this type of texture. The preferred source of this added protein is egg white. Other acceptable sources of protein that will give the product this lighter, airier texture include, but are not limited to, non-fat milk solids, casein, sodium caseinate, calcium caseinate, modified casein, sweet dairy whey, modified whey, and whey protein concentrate. For each product, the components may be combined with, for example, any planetary bowl mixer, ribbon blender, or other conventional mixer.

One embodiment of the present invention comprises a culinary premix product for which the consumer completes preparation. Accordingly, the dry blend, or the individual components thereof, may be mixed with a finely divided carbohydrate component, e.g. all-purpose flour, to form a dry mix useful in preparing baked goods. The components of the dry blend generally comprise only a minor portion of the chocolate-flavored morsels. Such a premix may be made by combining only morsels of the present invention and the other dry ingredients of the culinary premix. The consumer may then add a specified amount of shortening or oil, water, and eggs, and bake the resulting batter to form the desired product. Such a form of premix is especially suitable for sale to a consumer for baking in the home.

A culinary premix more suitable for sale to a commercial baker includes dry egg solids in the mix so that the baker need only to add water to form the batter for baking. The premix also comprises from about 10% to about 25% of a shortening component, from 0% to about 6%, preferably from about 0.1% to about 6%, on a dry solids basis, of an egg component and from 0% to about 2%, preferably from about 0.1% to about 2%, of a leavening agent.

Packaging of the dry premix product in a sealed plastic film is sufficient. Since the water activity of the dry mix is essentially nil, i.e. from about 0.2 to about 0.4, there is little concern about microbiological growth with extended storage periods. Packaging must be done using generally accepted good manufacturing practices for foodstuffs.

The components described above may be formulated in several slightly different ways to yield various types of baked goods, including but not limited to, brownies, snack cakes, muffins, and cookies, all of which are within the scope of the present invention. The batter or dough of the desired snack product may be baked using radiant, conductive or convective exposure to energy of a type which imparts thermal energy to the product being baked such as conventional, convection, microwave oven baking or combinations thereof. Baking times and temperatures are dependent on the type of oven used and the type of product being baked. The products may be baked in batch or continuous ovens.

A particularly advantageous use of the morsels of this invention is in the production of "chocolate-chip" cookies. Such cookies are among the most popular with consumers, if not the most popular. The use of these morsels will allow for the production of chocolate-chip cookies that have a reduced fat content. The production of cookies, particularly by mechanized methods, is described extensively by S. A. Matz, *Cookie and Cracker Technology,* (AVI Publ. Co., Westport, Conn., 1968), the disclosure of which is incorporated here by reference.

The morsels of the present invention are suitable for use with certain storage-stable, dual-textured cookies. A "laminate" version of these cookies is disclosed in U.S. Pat. No. 4,455,333 to Hong et al., issued Jun. 19, 1984, which is incorporated by reference. The laminated cookies of Hong et al. combine different doughs to produce a cookie having storage-stable, crisp and chewy textures. This is accomplished by distributing through the crumb-continuous matrix discrete regions of crumb containing readily crystallizable sugar and discrete regions of crumb containing a crystallization-resistant sugar. The result is a storage-stable plurality of textures, the regions containing crystallized sugar providing a crisp texture and the regions containing uncrystallized sugar providing a chewy texture.

In addition, U.S. Pat. No. 4,503,080 to Brabbs et al., issued Mar. 5, 1985, (incorporated herein by reference) discloses a similar storage-stable dual-textured cookie where the discrete regions of crisp texture contain a readily crystallizable sugar and the discrete regions of chewy texture contain a readily crystallizable sugar, plus a polyol crystallization inhibitor. U.S. Pat. No. 4,344,969 to Youngquist et al., issued Aug. 17, 1982 (incorporated by reference) discloses yet another method for preparing such cookies from a single-dough where sugar crystallization is controlled by enzyme activity. Manipulation of water activity is one means used for activating and inactivating the enzymes of selected portions of the cookie. Thus, sugar and/or starches in the areas where the enzyme is active are converted into mixtures which are non-crystallizing, or crystallization resistant, while the crystallization behavior of sucrose is preserved in those areas where the enzyme is inactive. The resulting dough and subsequent crumb areas of the baked cookie have storage-stable, crisp and chew textures, respectively.

The crumb-continuous matrix of these dual-textured cookies (and the inclusion of chocolate flavored morsels according to the present intention within this matrix), may be achieved by using any of the methods disclosed in the above Hong et al., Brabbs et al., and Youngquist et al. patents. Preferred cookie and cookie dough products are made by a process of preparing a first cookie dough from typical cookie ingredients containing a crystallization-resistant sugar or a sucrose or solution thereof optionally, and an effective amount of a sugar crystallization inhibitor for the sucrose; preparing a second cookie dough containing a sucrose or solution thereof; and substantially enveloping the first dough with a layer of the second dough, thereby forming a ready-to-bake, laminated dough structure which is then baked to yield a dual-textured cookie.

Sugar, flour, water and shortening, when combined in almost any reasonable proportions, will produce a dough that may be baked to form a cookie—the classic "sugar cookie". Of course, the sweetness, texture and similar organoleptic properties of the cookie depend upon the sugar/flour/water/shortening ratio. In general, any cookie recipe which produces an organoleptically acceptable crumb-continuous cookie (as opposed to filled and sandwich-type cookies) may be used.

After baking, this crumb continuous matrix preferably has a final water activity, $a_w$, of from about 0.25 to about 0.8, most preferably from about 0.45 to about 0.60. Cookie baking time typically ranges from about 5 minutes to about 15 minutes, depending on the number of cookies being baked, the size and shape of the cookie, the cookie ingredients, oven temperature, and like factors. The baking process can be conducted according to the methods described in the above patents. Baking may be performed in the batch mode, as typically done in the home, or in a continuous fashion, as is often done in commercial bakeries.

To realize a maximum shelf life for any of the final baked products prepared according to the present invention, packaging which allows no moisture to pass from the snack product to the environment or vice versa is desirable. A product packaged in this way would not be degraded at all whether stored in conditions of low or high humidity. Moisture tight packaging that allows for microwave heating of the product prior to eating would be most desirable. The packaging should be done using generally accepted good manufacturing practices.

The following examples will illustrate the invention, but should not be construed to limit the scope thereof unless otherwise expressly noted. All parts, percentages and ratios set forth here are by weight unless otherwise noted in content.

A major amount is more than 50% by weight, whereas a minor amount is less than 50% by weight.

EXAMPLES

EXAMPLE 1

CHOCOLATE-FLAVORED CANDY BARS OR MORSELS

Chocolate-flavored candy bars and morsels were prepared as follows.

| Ingredients | Grams |
|---|---|
| I. Cocoa Component: | |
| Cocoa Powder (non fat) | 215 |
| Kaomel Vegetable Oil | 150 |
| Lecithin | 10 |
| II. Seedling Component: | |
| Chocolate Compound | 180 |
| Kaomel Vegetable Oil | 86 |
| Lecithin | 5 |
| MIRA-GEL ® 463 Starch | 143 |
| III. Bob Syrup[1]: | |
| Sucrose | 2,775 |
| STALEYDEX ® 333 Dextrose | 562 |
| KRYSTAR ® 300 Crystalline Fructose | 460 |
| Salt | 5 |
| Water | 1,000 |
| Vanilla | 12 |
| Dimodan PVK Emulsifier | 15 |

[1]Bob Syrup is a syrup composed of crystallizable saccharide.

Procedure:

1. Mix the ingredients of the Cocoa Component and hold at 140° F.
2. Mix the ingredients of the Seeding Component and hold at 140° F.
3. Mix the first five listed ingredients of the Bob Syrup and cook to 246° F.
4. Weigh 1844 grams of the resulting mixture.
5. Mix and cool to 200° F.
6. Add vanilla and Dimodan PVK Emulsifier to the 1844 grams of Bob Syrup.
4. Add the Cocoa Component to the 200° F. syrup and mix.
5. Add the Seeding Component to the 200° F. syrup and disperse it quickly.
6. Allow 3 to 5 minutes for the extrusion consistency to develop.

Shaping the Confection:

The three methods below are suggestions and not limitations as to how to shape the confection.

Method 1

1. While still warm, extrude the confection and die face cut pieces to desired size.
2. Place the pieces of confection into a revolving drum and tumble them to round their shape.
2. Allow to cool.

Method 2

1. While still warm, extrude a flat ribbon shape stream of confection.
2. Pass the ribbon of confection under a die roller to print the bar design.
3. Cut into bar lengths
4. Allow to cool.

Method 3

1. While still warm, form continuous rope of confection.
2. Pass rope of confection through a cutting device.
3. Allow to cool.

EXAMPLE 2

COOKIE WITH CHOCOLATE-FLAVORED MORSELS

Cookies were prepared with the chocolate-flavored morsels of Example 1 as follows.

| Ingredients | Amounts |
|---|---|
| All-purpose flour | 2½ cups |
| Baking soda | 1 teaspoon |
| Salt | 1 teaspoon |
| Butter, softened | 1 cup (2 sticks) |
| Sugar | ¾ cup |
| Brown sugar, firmly packed | ¾ cup |
| Vanilla extract | 1 teaspoon |

-continued

| Ingredients | Amounts |
|---|---|
| Eggs, whole | 2 |
| Chocolate-flavored morsels | 2 cups |

Procedure:

1. Preheat over to 350° F.
2. In small bowl, combine flour, baking soda and salt. Set aside.
3. In a large mixer bowl, beat butter, sugar, brown sugar and vanilla extract until creamy.
4. Beat in eggs.
5. Gradually add flour mixture.
6. Stir in chocolate morsels.
7. Drop by rounded measuring spoonfuls onto ungreased cookie sheets.
8. Bake 12–14 minutes at 350° F.

EXAMPLE 3

LOWER FAT CHOCOLATE CHIP COOKIES

A lower fat chocolate chip cookie can be prepared using the morsels of Example 1 as follows.

| Ingredients by Wt. | Parts |
|---|---|
| Flour, all purpose | 24.6 |
| Chocolate-flavored morsels | 24.6 |
| CREAMTEX (partially hydrogenated soybean and cottonseed oil from Durkee) | 4.1 |
| Brown sugar | 12.3 |
| Granulated sugar | 12.3 |
| Eggs, whole, fresh | 8.2 |
| Salts, iodized | 0.5 |
| Baking soda | 0.5 |
| Vanilla extract | 0.5 |
| Water | 9.3 |
| Enzyme-converted potato starch (PASELLI SA2, Avebe b.a.) | 3.1 |

Procedure

1. Cream salt, soda, and CREAMTEX with a mixer at medium speed.
2. Add eggs (and water, where applicable); mix well.
3. Mix in all remaining ingredients, including chocolate-flavored morsels.
4. Form balls with 20 g of batter. Flatten on a baking sheet to approximately 4×4 cm.
5. If too moist to roll into a ball, drop by teaspoon.
6. Bake at 109° C. (375° F.) for 10 minutes.

Additional advantages and modifications will be readily apparent to those skilled in the art. The invention in its broader aspects is therefore not limited to the specific details or representative examples described. Accordingly, departures may be made from the detail without departing from the spirit or scope of the disclosed general inventive concept.

What is claimed is:

1. A method of preparing a reduced fat extrudable confection comprising the steps of:

a) preparing a syrup component comprising a crystallizable saccharide and water, said syrup component supersaturated with respect to the crystallizable saccharide;

b) preparing a seeding component comprising oil-milled saccharide crystals finer than about 20 microns, instant starch having a cold-water solubility of greater than about 50% by weight, and an amount of fat wherein the amount of fat in the finished confection is about 5% to about 20% by weight; and c) mixing the seeding component throughout the syrup component to form a dough-like texture and initiate crystallization of the crystallizable saccharide; and d) forming a confection.

2. The method of claim 1 in which the instant starch is a non-birefringent, granular starch.

3. The method of claim 1 in which the instant starch is a non-granular drum dried starch.

4. The method of claim 1 in which the starch is a spray cooked instant starch.

5. The method of claim 1 in which the confection is flavored with cocoa, defatted cocoa, or chocolate liquor.

6. The method of claim 1 in which the crystallizable syrup comprises a major amount by weight of sucrose, dextrose, fructose, sorbitol, mannitol, or xylitol.

7. The method of claim 1 in which the amount of instant starch is sufficient to comprise from about 1% to about by weight of the confection.

8. The method of claim 1 in which the amount of fat in the seeding component is sufficient to provide the confection with a fat content of about 10 to about 12% by weight of the confection.

9. The method of claim 1 in which the amount of water in the mixture is from about 6% to about 10% by weight of the mixture.

10. The method of claim 1 in which the oil-milled saccharide crystals in the seeding component are contained in chocolate compound.

11. The method of claim 1 in which the oil-milled saccharide crystals in the seeding component are contained in standard chocolate.

12. The method of claim 1 in which the oil-milled saccharide crystals in the seeding component is contained in white compound.

13. A method of preparing an edible reduced fat confection comprising:

a) preparing a supersaturated syrup comprising greater than about 50% by weight of a crystallizable saccharide selected from the group consisting of sucrose, dextrose, fructose, sorbitol, mannitol and xylitol;

b) preparing a flavoring component from about 50% to about 70% by weight of cocoa powder with about 30% to about 50% by weight of fat, and about 1% to about 2% by weight of emulsifier;

c) preparing a seeding component comprising about 40% to about 50% by weight of chocolate compound, wherein said chocolate compound contains oil-milled saccharide crystals finer than about 20 microns, about 20% to about 25% by weight fat, about 1% to about 2% emulsifier, and about 30% to about 40% by weight of a an instant starch;

d) preparing a mixture of the syrup component and the flavoring component;

e) adding seeding component to the flavoring and syrup mixture in a proportion to form a dough-like material comprising about 5% to about 20% by weight of fat; and f) extruding or shaping the material as solid confectionery morsels or bars.

14. Chocolate-flavored confection having a dough-like extrudable consistency, comprising greater than about 40% by weight of a crystallizable saccharide and including from about 1% to about 5% by weight of saccharide crystals having a particle size less than about 20 microns, from about 1% to about 10% by weight of hydrated instant starch, from about 5% to about 20% fat, and a minor amount of cocoa powder or chocolate liquor.

15. Confection of claim 14 in which said crystallizable saccharide comprises sucrose, dextrose, fructose, sorbitol, mannitol, or xylitol or a mixture thereof.

16. Confection of claim 14 in which said flavoring is added as de-fatted cocoa or as chocolate liquor.

17. The method of preparing a flavored confection comprising:

(a) preparing an aqueous syrup mixture comprising a major amount by weight of a crystallizable saccharide, heating said aqueous syrup to make it supersaturated with respect to said crystallizable saccharide, cooling said aqueous syrup to less than about 200° F.;

(b) preparing a low-moisture seeding component comprising oil-milled saccharide crystals finer than 20 microns, a fat component, and an instant starch having a cold-water solubility of greater than 50 weight percent, and an amount of water insufficient to hydrate the instant starch or dissolve the crystalline saccharide.

(c) preparing a flavoring component comprising flavoring ingredients;

(d) adding said flavoring component to said syrup mixture and mixing to form a flavored syrup mixture;

(e) adding said seed mixture to said flavored syrup mixture and mixing in proportions and under conditions to disperse said seed mixture to form a confectionery mixture having about 5% to about 20% by weight fat; and (f) dividing said confectionery mixture into separate portions in an environment that allows said crystallizable saccharide to crystallize.

18. A flavored confectionery piece comprising at least 40% by weight of a crystallizable saccharide, at least a portion of said crystallizable saccharide comprising oil-milled saccharide crystals finer than about 20 microns; from about 5% to 20% by weight of a fat ingredient; a minor amount of weight of flavoring ingredients; a minor amount by weight of an instant starch having a cold-water solubility of greater than 50 weight percent; and a minor amount of water, the amount of water in said confectionery piece being insufficient to dissolve a major portion of said minor amount of instant starch; and said confectionery pieces being capable of being extruded or shaped.

19. The method of claim 1 in which a flavoring component is added to the syrup.

20. A flavored confection, comprising greater than about 40% by weight of crystallizable saccharide, and including from about 1% to about 5% by weight of oil milled saccharide crystals finer than about 20 microns, from about 1% to about 10% by weight of hydrated instant starch, from about 5% to about 20% fat and a minor amount of a flavoring ingredient.

* * * * *